Oct. 6, 1936.   H. F. GARMAN ET AL   2,056,395
RECORD CONTROLLED MACHINE
Filed Aug. 23, 1932   3 Sheets-Sheet 1

Oct. 6, 1936.    H. F. GARMAN ET AL    2,056,395
RECORD CONTROLLED MACHINE
Filed Aug. 23, 1932    3 Sheets-Sheet 2

Oct. 6, 1936.  H. F. GARMAN ET AL  2,056,395
RECORD CONTROLLED MACHINE
Filed Aug. 23, 1932   3 Sheets-Sheet 3

| ARTICLE | | SALES | | RETURNS | |
|---|---|---|---|---|---|
| | | QUANTITY | VALUE | QUANTITY | VALUE |
| 1011 | 1 | 187* | 187000* | * | * |
| 1011 | 2 | 287* | 2287000* | * | * |
| 1012 | 1 | 99* | 99000* | * | * |
| 1012 | 9 | 091* | 0091000* | 8* | 8000* |
| 1012 | 2 | 491* | 0491000* | 8* | 8000* |
| 1071 | 9 | 990* | 9990000* | 10* | 10000* |
| 1071 | 2 | 525* | 0525000* | 95* | 95000* |

INVENTORS
Hugh F. Garman
Herbert H. Woodruff
BY
ATTORNEY

Patented Oct. 6, 1936

2,056,395

UNITED STATES PATENT OFFICE 2,056,395

RECORD CONTROLLED MACHINE

Hugh F. Garman, Detroit, Mich., and Herbert H. Woodruff, Cleveland, Ohio, assignors, by mesne assignments, to International Business Machines Corporation, New York, N. Y., a corporation of New York Application August 23, 1932, Serial No. 630,056

3 Claims. (Cl. 235—92)

This invention relates to record controlled machines in general, particularly those employed in compiling accounting and statistical data from perforated record cards.

Such machines commonly are equipped with accumulating mechanism, printing mechanism, and total taking mechanism for controlling the printing mechanism in accordance with totals accumulated by the accumulating mechanism whereby to print such totals on the record sheet. The total taking mechanism is commonly controlled by what is known in the art as automatic group control mechanism which automatically initiates a total taking and resetting cycle as a consequence of a change in the group numbers identifying items on the controlling records. Such group control mechanisms often are so arranged that they control in accordance with changes in two or more classifications to initiate total taking cycles when one or more of the group members change or several change simultaneously. Application Serial No. 227,127, filed October 19, 1927 by James W. Bryce, now Patent No. 1,933,308, describes and claims a form of automatic group control mechanism wherein from one to three total taking and resetting cycles are automatically initiated when from one to three changes in the group numbers take place.

Heretofore tabulating machines of the Hollerith type have been designed to reset the accumulators or counters to zero whenever a change occurs in the major group number resulting in a total being printed as a direct consequence of such change. As will be shown later herein, it is sometimes desired to eliminate printing of a total when a change occurs only in the major group number without, however, eliminating the resetting of the accumulators or counters to zero and to produce this result automatically without manual control of the resetting mechanism.

The primary object of the present invention is to provide means automatically called into action as a result of a change in the group number for preventing the printing of a total and at the same time automatically initiating a resetting operation to restore the accumulators or counters to zero position.

Various other objects, advantages, or features of the invention will be pointed out in the following description and claims or will be apparent after a study thereof and of the accompanying drawings.

In the drawings:

Fig. 4 is a view of a portion of a card used to control the machine;

The present invention will be described in connection with a machine of the type disclosed in Patent No. 1,762,145 and equipped with automatic group control mechanism like that described in the Bryce patent mentioned above. In the present case, the automatic control mechanism will be illustrated and described as operative to control the total taking and resetting mechanism as a consequence of a change only in the major or minor group numbers or in both. It will be understood, however, that the present invention may be embodied in a machine controlled in accordance with a change in a single group number or in accordance with changes in more than two group numbers.

It will be helpful in understanding the following description and the accompanying drawings if it be borne in mind that cam contacts designated with the letters L and T are active while the tabulating mechanism is in operation while those designated by the letters P and LP operate when the total taking and resetting mechanism is functioning.

The circuits of the Bryce patent above cited have been simplified and rearranged somewhat to eliminate crossing wires and unnecessarily long connecting wires and to make the diagram as self-explanatory as possible. In a few instances minor changes have been made to simplify the machine and improve the operation of the machine as a whole.

Such changes as have been made will be described in detail hereinafter where necessary to an understanding of the present invention.

Figure 1:
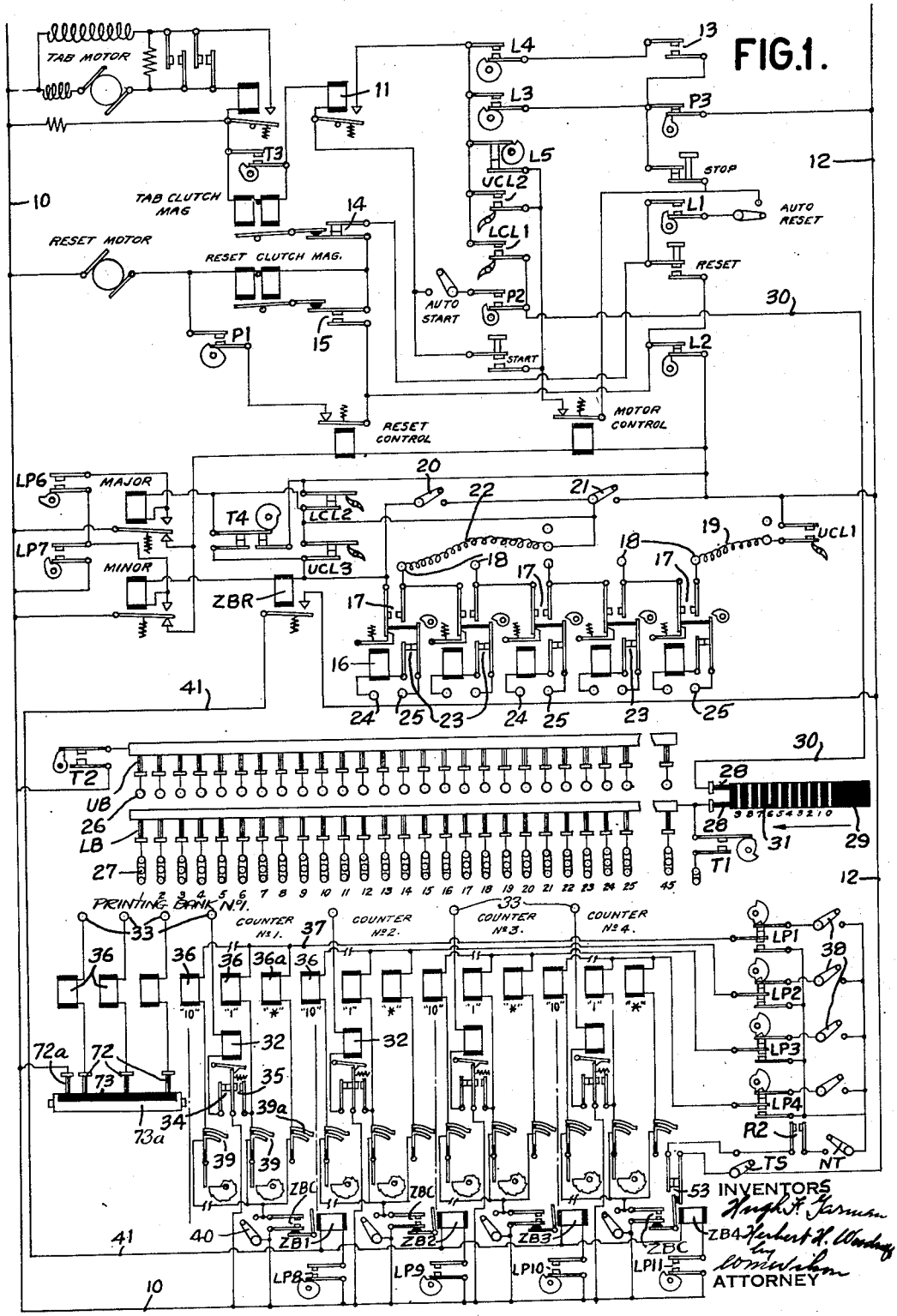
Fig. 1 is a diagram showing the electrical connections of the present invention.

The tabulating mechanism is driven by means of a tabulating motor indicated in Fig. 1 by the words "Tab. motor", which motor is controlled by means of a motor control relay designated "Motor control" through the automatic group control mechanism to be described presently. The normal operating circuit for the tabulating motor when tabulating items without listing extends from the left line wire 10, through said motor, the tabulator clutch magnet, designated "Tab. clutch mag.", the motor relay 11, and the cam contacts L3, P3, to the right line wire 12. When the machine is listing items, the circuit extends through the cam contacts L4 and listing contacts 13, instead of through the contacts L3. The cam contacts L3, L4 close immediately after the motor has been started and maintain a circuit through said motor until shortly before the end of each card cycle, whereupon they reopen. The action of these contacts is explained in Patent No. 1,762,145.

In order to start the tabulating motor, the start key, designated "Start" in Fig. 1, is provided, which is connected between the points of the motor control relay and the motor relay 11. When the start key is depressed, assuming that the motor control relay has been previously deenergized to close its points, the starting circuit will be established from left line wire 10, through the tabulating motor, the tabulator clutch magnet, the motor relay 11, the start key, the contacts of the motor control relay, the stop key, designated "Stop", and the cam contacts P3 to the right line wire 12. Energization of the motor relay 11 causes it to set up a holding circuit around the start key through the cam contacts L3 and P3 when the machine is tabulating only, or through the contacts L4 and 13 when the machine is listing.

The motor control relay is in series with the resetting control relay, designated "Reset control", and the lower points of the major and minor relays across the line wires 10, 12. When the line wires 10, 12 are connected to the main current supply line (not shown) current will flow from the left line wire 10, the lower contacts of the major and minor relays in parallel, the reset control and motor control relays to the line wire 12, thereby energizing both the last named relays and causing them to open their contacts. It will be obvious, therefore, that the tabulating motor cannot be started until the circuit through the reset control relay and motor control relay has been interrupted. Deenergization of the reset relay and motor control relay is accomplished by initiating a resetting cycle which will be followed by a second resetting cycle.

A resetting cycle is initiated by means of the reset key, designated "Reset", which sets up a circuit from the left line wire 10, through the reset motor, the reset clutch magnet, contacts 14, (closed when the tabulator clutch magnet is deenergized) the reset key, the cam contacts L2 to the line wire 12. Energization of the reset clutch magnet establishes a driving connection between the reset motor and the total taking and resetting mechanism and at the same time closes contacts 15 associated with said reset clutch magnet, thereby setting up a holding circuit for the reset clutch magnet around the reset key through the cam contacts L2 to line wire 12. Ordinarily, closure of cam contacts P1 early in a resetting cycle would short circuit the reset clutch magnet and stop the reset motor when said contacts P1 reopen at the end of the cycle. However, the contacts of the reset control relay are still open and such action is prevented causing the circuit to be held through contacts 15.

During this first resetting cycle the cam contacts LP6 close and reopen and immediately thereafter the cam contacts LP7 close, thereby setting up a circuit for the minor control relay which circuit extends from left line wire 10, cam contacts LP7 (closed), the minor relay, a zero button relay ZBR, both pairs of cam contacts T4 (closed when the tabulating mechanism is at rest in its normal position), to the right line wire 12. A branch circuit exists through the upper card lever contacts UCL3 and the lower card lever contacts LCL2 to the line wire 12, provided no cards are under the upper or lower brushes. Energization of the minor control relay during the last part of this cycle causes it to close its upper points, thereby setting up a holding circuit for said relay to the line wire 10. During this cycle the circuit through the major relay remains open so that both the motor control relay and reset control relay remain energized.

Since the cam contacts L2 remain closed throughout a resetting cycle and the reset control relay is still energized holding its points open, the reset motor will not come to a stop at the end of the cycle but will continue to turn, thereby causing a second resetting cycle. Owing to the fact that the minor relay remains in energized condition during this second cycle with its upper points closed, cam contacts LP6, closing and reopening slightly before contacts LP7, will set up a circuit extending from the line wire 10, through the upper contacts of the minor relay, cam contacts LP6, the major relay, and the cam contacts T4, to the line wire 12. Energization of the major relay will cause it to close its upper points, thereby setting up a holding circuit which is maintained through the upper points of said relay. At the same time the opening of its lower points causes deenergization of the reset control and motor control relays, consequently both the last named relays close their points.

During the second resetting cycle, closure of the cam contacts P1 will short circuit the reset clutch magnet, and due to the fact that the clutch connecting the reset motor with the total taking mechanism is of the one revolution type, the deenergization of reset clutch magnet will have no effect for the moment. Cam contacts P1 reopen at the end of the cycle, thereby breaking the circuit through the reset motor and causing the latter and the total taking and resetting mechanism to come to rest in a definite position.

The tabulating motor may now be started manually by depressing the start key which will set up a circuit through the tabulating motor, the tabulator clutch magnet, the motor relay 11, the start key, the points of the motor control relay, the stop key, and cam contacts P3 to the line wire 12. This circuit will take effect regardless of whether or not there are any cards under the brushes. Shortly after the tabulating motor starts to drive the tabulating mechanism, the cam contacts L3 close and remain closed until near the end of the cycle, whereupon said cam contacts L3 reopen. If the motor control relay is deenergized and the upper card lever contacts UCL2 are closed during the period when the cam contacts L3 are open, the motor will continue to run, but, if the motor control relay is energized or the card lever contacts UCL2 are open, the tabulating motor will stop, thereby bringing the tabulating mechanism to rest in a definite position.

The reset motor will be started automatically whenever the tabulating motor stops due to the last card passing from beneath the lower brushes or as a consequence of the motor control relay opening its contacts. For this purpose there are provided cam contacts L1 and an automatic reset switch, designated "Auto. reset", which are in a series circuit between the stop key and the reset key. Cam contacts L1 are timed to close toward the end of a cycle of the tabulating mechanism.

When the automatic reset switch is closed, the stopping of the tabulating motor will cause the contacts 14 to close due to deenergization of the tabulator clutch magnet. Consequently, closure of contacts L1 near the end of the tabulating cycle will set up a circuit from the line wire 10, through the reset motor, reset clutch magnet and contacts 14, cam contacts L1, the auto reset switch, the stop key and cam contacts P3, to the line wire 12. The reset motor will start exactly as if the reset key had been depressed, and will drive the total taking and resetting mechanism through one or two cycles, depending, of course, upon whether the minor relay alone is deenergized or both the minor and major relays are deenergized. It will be seen that the condition of the major and minor relays determines the number of resetting cycles to be performed.

While the tabulating mechanism is in operation and cards are being fed through the machine, the major and minor relays are controlled by means for comparing the group designations of two successive cards. For the purpose of controlling the major and minor relays there is usually provided a group of ten relays 16 only five of which are shown in Fig. 1 in order to simplify the diagram. Each of the relays 16 has a pair of contacts 17 which are normally open but are adapted to be closed whenever the relay 16 is energized.

The contacts 17 are in series and the circuit thus formed is connected in shunt with the lower points of cam contacts T4 through upper card lever contacts UCL1 and each series connection between the contacts 17 is provided with a plug socket 18. The last plug socket 18 on the right, Fig. 1, is connected by means of a plug wire 19 to a binding post connected to the contacts UCL1. The plug wire 19 may be inserted in any of the plug sockets 18, depending upon the number of columns in the record cards devoted to receiving the holes designating major group numbers. The contacts 17 and contacts UCL1 may be shunted by means of two switches 20, 21 in series across said contacts.

One terminal of the switch 21 is connected to the wire joining the contacts LCL2 and UCL3 and also to a binding post to which is attached a second plug wire 22. The plug wire 22 likewise may be inserted in any of the plug sockets 18.

Each relay 16 also has a pair of normally closed contacts 23 which are connected in series with their associated magnets between a pair of plug sockets 24, 25. The upper brushes are designated UB (Fig. 1) and have a common contact bar which is connected to line wire 10 through the cam contacts T2, while each of said brushes is individually connected to a plug socket 26. Thus, holes in a card passing between the contact bar and the upper brushes UB will be sensed by said brushes. Similarly, the lower brushes LB are provided with a common contact bar and a triple plug socket 27.

The common bar for the brushes LB is connected to one of a pair of brushes 28 cooperating with a commutator which is driven by the tabulating mechanism at the rate of one revolution per tabulating cycle. The other brush 28 of the commutator 29 is connected through a wire 30 to the cam contacts P2 and lower card lever contacts LCL1, the latter having a connection to a common wire to which cam contacts L3 are also connected. Commutator 29 is provided with a number of bars or spots 31 corresponding to the number of index point positions in the record card and so timed that the bars 31 will connect the brushes 28 electrically at the points where the upper and lower brushes, respectively, read corresponding index point positions in the cards. Since ten index points in the record card are usually assigned to receiving holes designating numerical data, the commutator 29 likewise has ten bars. The bars 31 are of just sufficient width so that contact between the brushes 28 is made after a brush has entered a perforation in the card and is broken before the brush leaves such perforation. Thus, arcing of the brushes is prevented and current can only flow during the time when the brush is actually in contact with its contact bar.

In Fig. 1 the plug sockets 27 have been numbered consecutively from left to right to correspond with the columns of the record card sensed by the coacting brushes and the upper brushes UB have been placed directly over the related lower brushes. Thus, the plug sockets 26, 27 above the numeral 1, for instance, are plug sockets corresponding to the upper and lower brushes, respectively, which sense corresponding holes in the first column of two successive record cards. The relays 16 may be plugged in series with the upper and lower brushes for the purpose of sensing changes occurring in the holes representing group numbers. The manner in which this is done will now be briefly described.

It will be assumed that the major group numbers comprise four digits and hence four columns of the record card are assigned to receiving the holes representing the major group numbers, while only one column of the record card will be assigned to receive holes designating the minor group numbers. It will be assumed also that the major group numbers appear in columns 1 to 4 of the record card, while the minor group numbers appear in column 5. The plug sockets 26 above the numerals 1 to 4, Fig. 1, will be plugged to the plug sockets 24 of the four relays 16 on the right, Fig. 1, while the plug sockets 25 of said relays will be connected by plug wires to the plug sockets 27 above the numerals 1 to 4, inclusive.

The first relay 16 on the left (Fig. 1) will similarly be plugged between the plug sockets 26, 27 above the numeral 5 in Fig. 1. The plug wire 22 will be placed in the plug socket 18 corresponding to the contacts 17 of the first relay on the left, Fig. 1, while the plug wire 19 will remain in the plug socket 18 of the first relay on the right (Fig. 1). Thus, the first relay 16 on the left (Fig. 1) will be plugged in series with the upper and lower brushes corresponding to the fifth column of the record card, whereas the remaining four relays 16 will be plugged in series with the upper and lower brushes corresponding to the first four columns of the record card.

When cards are fed through the machine the upper and lower brushes will sense the corresponding index point positions of two successive cards simultaneously, therefore, as long as the holes in corresponding columns of two cards agree, series circuits will be set up through the relays 16 which are plugged to the upper and lower brushes corresponding to the columns in which the holes agree. As a result the magnets 16 will be energized when the corresponding upper and lower brushes sense conforming perforations, due to circuits being set up from the line wire 10, through the cam contacts T2 and the common bar, the upper brushes of the columns in which the holes agree, the windings of the relays 16 plugged to said brushes, the corresponding lower brushes, the common contact bar, the commutator bars 31 corresponding to the index point positions in which holes occur, the wire 30, contacts LCL1 (closed), cam contacts L3 and P3 (or contacts L4, 13 and P3) to the line wire 12.

Energization of any relay 16 will, of course, cause its contacts 17 to close and its contacts 23 to open, thereby preventing arcing at the brushes. If the holes agree in all five columns of the cards, all of the contacts 17 will be in closed condition when the cam contacts T4 open at the end of the cycle. Consequently, neither the major nor the minor relay will become deenergized since the cam contacts will be shunted by contacts 17 and UCL1 in series.

If it should happen that the holes do not agree in any one or more of the first four columns of the record card, one or more of the four relays on the right (Fig. 1) will not be energized and the associated contacts 17 will be in open condition at the time the cam contacts T4 open. As a result, both the major relay and the minor relays will be deenergized, thereby completing the circuit to the motor control relay and reset control relay, causing the motor to stop and the tabulating mechanism to come to rest.

If the auto reset switch is closed, the machine will go through two resetting cycles as described before and thereafter the tabulating motor will automatically start and the tabulating mechanism will become effective to tabulate the cards of the next group of cards.

The cam contacts P2 close about the end of each total taking cycle and, provided the auto start switch, (designated "Auto. start" in Fig. 1) and the contacts of the motor control relay are closed, the tabulating motor will start automatically after each resetting cycle.

If a change occurs in the fifth column of the cards, the first relay on the left (Fig. 1) will not be energized and the contacts 17 of said relay will remain open. Consequently, the opening of the cam contacts T4 near the end of the cycle will cause the minor control relay to be deenergized, thereby energizing the motor control relay. The major control relay will not be deenergized since the circuit for said relay will still be maintained through the plug wire 22, the contacts 17, and upper card lever contacts UCL1. The machine will go through a single resetting cycle and then will resume tabulating operation.

At the end of each tabulating cycle the contacts 17 and 23 are latched up by means of cams in readiness for the next cycle. The mechanical construction of the relays 16 and their restoring cams is described in detail in Patent No. 1,822,594.

The accumulating and printing mechanisms are substantially the same as the ones disclosed in Letters Patent Nos. 1,762,145 and 1,822,594, therefore, only a brief description of their construction and operation will be given herein.

The machine illustrated in the above patents is ordinarily provided with five accumulators or counters, as they are called, associated with each of which is a bank of type bars for printing both items and totals of said items, while two additional printing banks are provided which have associated therewith listing magnets for printing group numbers or classification data. In the illustrative example given hereinafter to show the manner in which the present invention is used in practice, only four accumulators or counters and one printing bank will be needed, consequently, the disclosure will be limited to such number.

The accumulators are ordinarily provided with ten wheels of which nine are adapted to receive entries from the cards while the tenth is merely an overflow wheel to accumulate the units carried over from the ninth or next to the highest order wheel. In the drawings only the three typical circuits for each accumulator and its associated printing bank will be shown; that is to say, the asterisk printing circuit (designated "*" in Fig. 1), the circuit associated with the first or lowest denominational order wheel (designated "1"), and the circuit associated with the highest order wheel (designated "10"). The nine wheels comprising the lowest denominational orders of the counters each have associated therewith a counter magnet 32, the function of which is to cause engagement of the clutch connecting the counter wheel to a drive shaft driven by the tabulating motor. The energization of the magnets 32 is effected under the control of the lower brushes when the latter read the differentially located holes representing the amount to be entered in the counter. Each counter magnet 32 is connected to a plug socket 33 and also to one of a pair of contacts 34 which are normally latched in closed position, but are caused to be opened whenever the associated magnet 32 is energized.

Associated with the contacts 34 of each magnet 32 is a second pair of contacts 35 which are normally open, but are closed by energization of the magnet 32. The contacts 34, 35 of each counter have a common member which is connected to the left line wire 10, through a common bus bar (not shown) individual to that counter to which the other magnets 32 of the same counter are likewise connected. Contacts 35 are connected to a listing magnet 36. The listing magnets in each counter have a common connection 37 to one of several cam contacts designated LP1 to LP4, respectively, there being one set of cam contacts for each accumulator or counter. Thus, in Fig. 1, the common connection 37 of the magnets 36 in counter No. 1 is connected to the cam contacts LP1 and the common connections of printing magnets 36 in counters Nos. 2, 3 and 4 are connected, respectively, to the cam contacts LP2, LP3 and LP4. By means of the plug sockets 33 any counter magnet 32 can be plugged to any one of the triple plug sockets 27 whereby to receive an impulse due to a hole in the corresponding column in the record card under the lower brushes at the time when the selected brush reads the hole.

Energization of a magnet 32 causes it to attract its armature which causes the clutch associated with said magnet to engage the associated counter wheel with the driving shaft, and, at the same time contacts 34 open, contacts 35 close. This causes a circuit to be established from the left line wire 10, contacts 35, listing magnet 36 and the cam contacts LP1, for instance, the non-total switch NT, contacts R2 (closed), the total suppression switch TS (closed), to the right line wire 12.

Figures 3, 5:
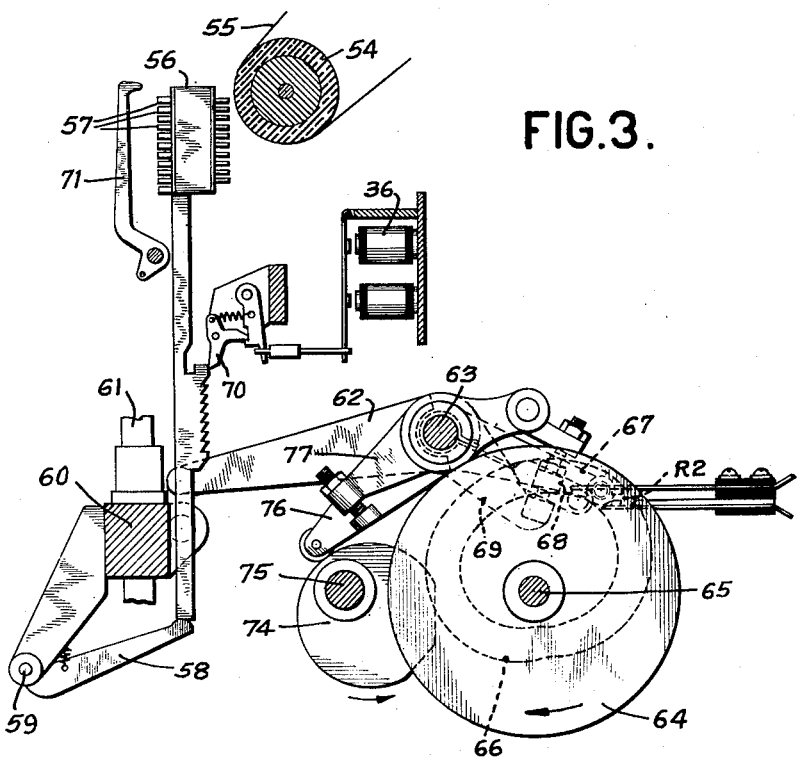
Fig. 3 is a vertical transverse section of a portion of the printing mechanism.
Fig. 5 is a view of a portion of the record sheet.

The contacts R2 are controlled by an arm fixed to shaft 63 (Fig. 3). Said contacts are normally open but are closed as soon as the type bars 56 begin to move upwardly during listing operations or total taking operations. When the machine is tabulating cards without listing the contacts R2 prevent operation of the printing magnets 36 in the accumulator banks.

Energization of the printing magnet 36 corresponding to the counter magnet 32 which was energized causes the type bar associated with said magnet 36 to be arrested with the type corresponding in value to the hole read by the brush in position to print.

The cam contacts LP1 to LP4, inclusive, are actuated by stepped cams which, when the total taking and resetting mechanism is at rest, are positioned so that the upper member of each set of contacts is on the intermediate dwell of the cam in which position the upper contacts are closed and the lower contacts open, thereby connecting the common wires 37 to the non-total switch NT through switches 38 individual to the upper member of each set of contacts. During a resetting cycle cam contacts LP1 to LP4 turn in a clockwise direction (Fig. 1) which causes the lower contact of each set of cam contacts to close, thereby connecting the common wires 37 to the non-total switch, regardless of whether or not any of the associated switches 38 may have been opened.

The cam contacts LP1 to LP4, inclusive, together with switches 38 take the place of the non-list contacts NL1 to NL5, cam contacts LP1 to LP5, and the switches 634 described in Patent No. 1,762,145. If any switch 38 is open listing of items from the corresponding counter will be prevented, although accumulation of such items will be permitted When the non-total switch NT is open printing of totals from the counters will be prevented.

Totals are printed through the medium of stepped cams which are geared to the accumulator wheels as described in Patent No. 1,822,594. Associated with each stepped cam is a pair of total contacts 39, which are operated during each resetting cycle to sense the setting of the coacting stepped cams. As a result, the contacts 39 are closed at differentially spaced points of time during the resetting cycle depending upon the position of the associated cam. The contacts 39 are connected between the wire joining the magnets 36 to contacts 35 and a common bus wire individual to each counter, which common wire is connected to the line wire 10 through a pair of zero button contacts ZBC. The latter may be shunted by means of a switch 40.

As is usual in a machine of this type an extra type bar is provided in each bank associated with an accumulator or counter for the purpose of printing an asterisk opposite the total and has a magnet 36a similar to magnets 36 controlled by a pair of contacts 39a similar to contacts 39 in each counter. The contacts 39a operate to close the circuits through magnets 36a at a definite point in the resetting cycle so as to cause the asterisk type bars to be arrested in the proper position to print the asterisks adjacent the totals. The highest (tenth) wheel of each counter has associated therewith a magnet 36 which is connected to contacts 39 like the other magnets 36, however, no counter magnet is connected to the magnet 36 associated with the highest order wheel, since entries will never be made upon this wheel.

The contacts ZBC of all the counters are adapted to be closed by zero button magnets designated ZB1 to ZB4, respectively. The zero button magnets have a common connection to a wire 41, which is connected to one of the points of the zero button relay ZBR, the other point of the zero button relay being connected to the right line wire 12. The zero button magnets are also connected to the line wire 10 through cam contacts LP8 to LP11, respectively, which are timed to close early in each resetting cycle and to reopen near the end thereof.

As long as any of the switches 40 remain open totals cannot be printed from the counters in which switches 40 are open unless the corresponding zero button magnet is energized. When one or more of the switches 40 is closed, totals will be printed from the corresponding counters each time a resetting cycle is carried out. The zero button magnets, aside from controlling the printing of a total, also control the resetting of the associated counter to zero.

Figure 2:
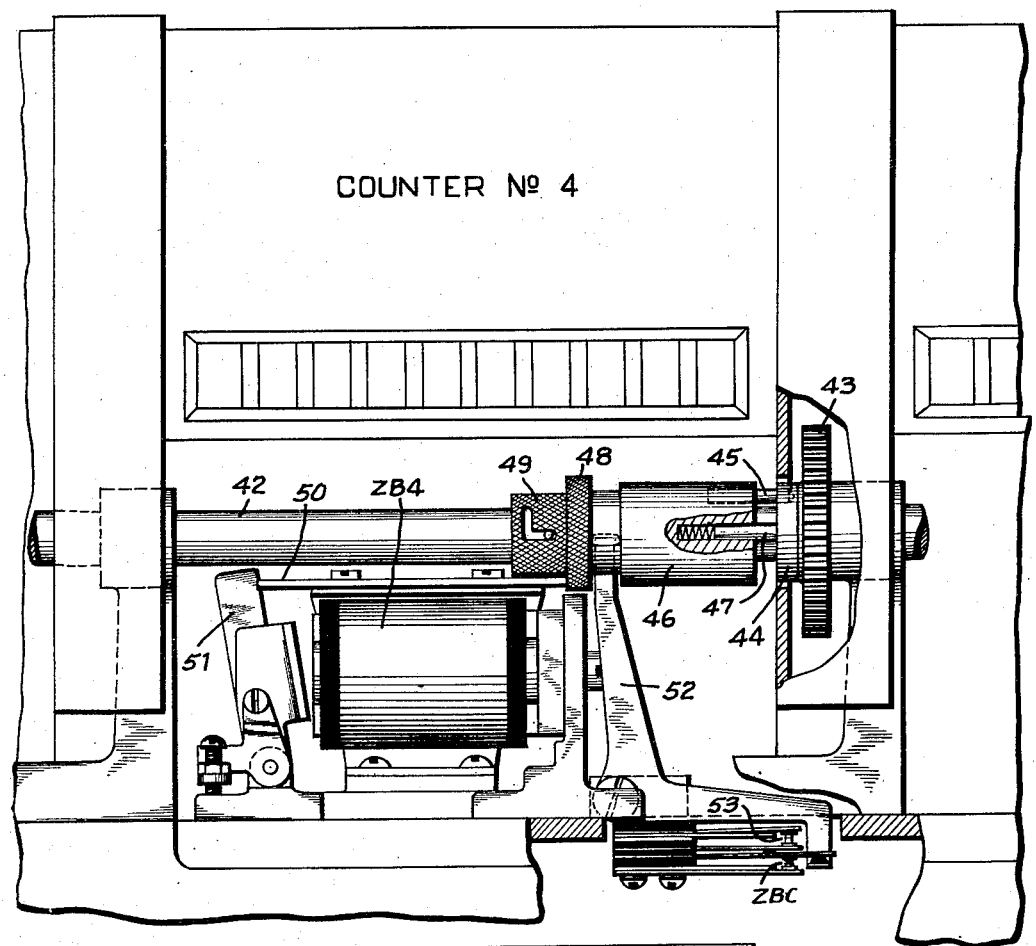
Fig. 2 is a front elevation of one of the accumulators or counters and illustrates the construction of the zero button magnets.

The mechanical structure of the zero button magnets is illustrated in Fig. 2 which shows the zero button magnet ZB4 of counter No. 4. The numeral 42 designates the resetting shaft which is driven one complete revolution during the last half of the resetting cycle through mechanism not shown. Loosely mounted on the shaft 42 is a gear 43 which meshes with a gear mounted on the counter shaft supporting the accumulator wheels of counter No. 4, which counter shaft is provided with a groove coacting with suitable pawls carried by the counter wheels to reset said wheels to zero whenever said shaft is given one complete revolution. This mechanism is more fully described in Patent No. 1,600,414, consequently it will not be described herein.

Fixed upon the shaft 42, adjacent the gear 43, is a collar 44 having a hole aligned with a similar hole in the gear 43. Projecting through the hole in the collar 44 is a pin 45 secured in the end of a sleeve 46 loosely and slidably mounted upon shaft 42. A spring pressed plunger 47 mounted in the sleeve 46 normally presses against the left side of collar 44 and tends to resist movement of the sleeve 46 toward the collar 44 so that pin 45 in sleeve 46 will be normally prevented from entering the hole in gear 43.

Loosely mounted upon the sleeve 46 is a knurled collar 48 by means of which the sleeve 46 may be manually shifted to the right (Fig. 2) to carry the pin 45 into the hole in gear 43, thereby operatively connecting the gear 43 to the shaft 42 owing to the fact that the collar 44 is fixed to said shaft. With the sleeve 46 held manually in shifted position, the reset key may be depressed thereby initiating a resetting cycle during which cycle the shaft 42 will be rotated to reset the counter. Loosely mounted on the shaft 42 is a knurled sleeve 49 having a bayonet slot formed therein into which projects a pin carried by the shaft 42. It is obvious that the sleeve 49 may be grasped with the fingers and pressed to the right (Fig. 2) thereby moving the pin 45 into the hole in gear 43 and, when in this position, the sleeve 49 may be turned relative to shaft 42 to lock the sleeve 46 and pin 45 in their right hand position, thereby positively coupling the gear 43 and shaft 42.

Coacting with the collar 48 is a slide 50 and abutting the left end of said slide is an arm 51 carrying an armature coacting with the magnet ZB4. It will be obvious that energization of magnet ZB4 will cause the arm 51 and slide 50 to move to the right (Fig. 2) thereby pressing the sleeve 46 to the right to bring the pin 45 into engagement with the hole in gear 43. It will be clear that, as long as the magnet ZB4 is energized, the gear 43 will be coupled to the shaft 42.

The sleeve 46 has a shoulder formed therein adjacent the collar 48 and lying in the groove thus formed is one end of a bell crank 52 pivoted at its mid-point to a fixed part of the machine. The other end of the bell crank 52 has a lug bent beneath one of a pair of spring contact members carrying contacts ZBC which are closed whenever the magnet ZB4 is energized to cause bell crank 52 to rock clockwise.

Associated with the magnet ZB4 of counter No. 4 only is a pair of spring contact members 53 which are normally held closed by a button of insulated material carried by the upper contact member of contacts ZBC. It will be obvious that the contacts 53 will open and the contacts ZBC will close whenever the bell crank 52 is rocked clockwise by energization of the magnet ZB4. The contacts 53 (Fig. 1) are connected in shunt with the total suppression switch TS. It will be obvious, therefore, that energization of the magnet ZB4 will prevent the printing of totals from any of the counters provided the switch TS is open and will do this automatically as a consequence of a change in the major group designations on the card. Relay ZBR is energized near the end of a minor resetting cycle when contacts LP7 close to energize the minor relay. Thus, the contacts of relay ZBR remain open during most of the minor resetting cycle and prevent resetting of the counters. Relay ZBR is energized at the beginning of a major reset cycle and holds its contacts closed, thus energizing magnets ZB1 to ZB4 and causing the counters to be reset automatically. With switch TS open, however, printing of totals will be suppressed during major cycles since contacts 53 are open when zero button magnet ZB4 is energized.

In Fig. 3 there is illustrated diagrammatically the well known recording mechanism of an accounting and statistical machine of the Hollerith type as illustrated and described in the patents above mentioned.

The numeral 54 represents the usual resilient platen adapted to support the record sheet 55 upon the surface of which items may be printed from the type bars 56. The latter are mounted to reciprocate vertically and carry a series of movable type elements 57 which may be forced against the record sheet 55 at the appropriate time and in a well-known manner. The lower ends of the type bars rest upon spring-urged arms 58 pivotally mounted at 59 on a crosshead 60.

The crosshead 60 is adapted to reciprocate upon vertical guide rods 61 supported by the machine frame and is moved vertically by arms such as 62 fixed to a cross shaft 63 carried by the machine frame. Normally the parts occupy the position shown in Fig 3 in which position none of the type elements 57 are at the printing line. Once each card cycle the arms 62 are raised by a cam 64 mounted upon a shaft 65 which is driven at the rate of one revolution per card cycle by the tabulating motor. The cam 64 has a cam groove 66 cooperating with a roller carried by a cam follower arm 67 loosely mounted on the shaft 63. The arm 67 has an offset lug 68 carrying an adjusting screw abutting a similar lug carried by an arm 69 fixed to the shaft 63. It will be obvious that, when the cam 64 makes one revolution in the direction of the arrow thereon (Fig. 3), the arm 67 will be drawn downwardly thereby rocking the arm 69 and shaft 63 in a clockwise direction to raise the arms 62 and move the crosshead 60 vertically, this movement being at a uniform rate and synchronous with the reading of the perforations in the record cards.

If there should happen to be a hole in any card column of the record card, the magnet 36 will be energized by current passing through the card reading brush in the usual manner which will cause a latch 70 associated with the magnet to be released in a well known manner, thereby arresting the corresponding type bar 56 with the type element 57 corresponding to the index point position in which the hole is present in position to print so that eventually, when the crosshead 60 reaches its upper limit of travel, the printing hammers 71 will be released in the usual manner and cause an impression to be taken upon the record sheet 55. During the remainder of the cycle the crosshead 60 is drawn downwardly thereby carrying downwardly all the type bars which were operated.

The cam 64 is loosely mounted on the shaft 65 as described in Patent No. 1,762,145 and is controlled by a one revolution clutch arranged to operatively connect said cam to the shaft 65 for driving purposes. When the machine is being operated to list items the list-non-list lever (not shown) is thrown to listing position and disengages a latch which effects coupling of the cam 64 and the shaft 65. Consequently, the cam 64 will be driven one complete revolution during each card cycle as described in said patent. When the list-non-list lever is set to the tabulating position or non-list the control is so arranged that during the first card cycle of a group of cards the cam 64 will make one revolution to cause the printing of the group numbers and thereafter will become latched to prevent further listing operations.

The machine is provided with an extra listing bank designated "Printing bank No. 1" (Fig. 1) which is provided with listing magnets 36 which control type bars in exactly the same fashion as the magnets 36 associated with the counters. Each magnet 36 of the printing bank is connected to a plug socket 33 and also to a brush 72 coacting with the insulated portion 73 of a commutator 73a when the tabulating mechanism is at rest. The commutator 73a has a common brush 72a connected to the line wire 10 and, as described in Patent No. 1,762,145, is operatively associated with the cam 64 so as to be driven through one cycle whenever said cam is operated. It will be obvious, therefore, that when the machine is operating non-listing the commutator 73a will make one revolution during the first card cycle of the group, thereafter remaining inactive. The extra listing banks of present types of tabulating machines usually have ten type bars which naturally requires ten magnets 36 and ten plug sockets 33 to enable the printing of several classification numbers or other data not to be accumulated. To save space and simplify Fig. 1 as much as possible only three such magnets 36 and their associated plug sockets 33 have been shown in Fig. 1.

As described in the patent, means is provided for releasing the latch in order to clutch the cam 64 to the shaft 65 during each total taking and resetting cycle so as to condition the machine for printing the group number from the first card of the group immediately following the one for which the total was printed. This mechanism is more completely described in the above patent and, since it is not directly involved herein, it will not be described in detail.

The type bars 56 are raised during a resetting cycle through the medium of a cam 74, mounted upon a shaft 75 which is driven one complete revolution by the reset motor during each resetting cycle. Coacting with the cam 74 is a roller on a cam follower 76 loosely mounted on shaft 63. The cam follower 76 has a lug coacting with the end of an adjusting screw carried by a similar lug on an arm 77 fixed to the shaft 63. The profile of the cam 74 is such that the type bars 56 will be raised at a uniform rate during the first half of the resetting cycle and is so timed that closure of any pair of contacts 39 in the counter by means of the associated stepped cam will cause the magnet 36 corresponding to said contacts 39 to become energized and arrest the type bar 56 associated therewith in a position with the type element 57 corresponding to the value of the step on the cam in printing position. By this operation totals are printed upon the record sheet 55 from the same type bars which effect listing of the items entered in a given counter. The total taking mechanism is more fully described in the patents above cited, consequently, it will not be described in greater detail herein as reference may be had to the patents for a more complete description.

In order to make clear the objects and usefulness of the present invention, it will be explained in connection with a specific example encountered in the practice of accounting by means of perforated records. It will be assumed that a given manufacturer of certain commodities wishes to secure a sales analysis upon a record sheet, which sales analysis requires several different totals for each commodity or article. This manufacturer wishes to know at the end of a given period, say a month, the total sales of each product sold during the current month, the total returns of each product during that period, the net sales of each product during the current month, and the net sales of each product for the year up to the end of the current month.

It would be impossible to get such a statement from machines in use heretofore without requiring a fairly complicated series of manual control operations between the groups of cards fed through the machine. According to the present invention such a statement can be readily secured automatically without any intervening manual control by the operator, it being merely necessary to feed the cards through the machine and during the passage of the cards the various classes of items will be tabulated and the totals thereof printed automatically, this operation continuing until the cards have become exhausted.

In order to secure the desired result the items denoting sales may have the article numbers perforated in columns 1 to 4 of the record card. In column 5 of the record card will be a control number signifying the kind of card, for instance, whether the card represents sales, returned goods, or the net sales for the current year to the first of the current month. The three classes of cards will probably be distinguished from one another by different colors, over printed letters, color stripes or the like. Furthermore, in the fifth column of the sales cards a hole will be perforated in the "1" index point position; in column 5 of the cards representing returns a hole will be made in the "9" index point position; while in the cards representing net sales up to the first of the current month a hole will be made in the "2" index point position.

The cards representing sales will have the quantity of sales perforated in columns 6 to 8 and the value thereof perforated in columns 9 to 15 in direct numbers, columns 16 to 25 of sales cards not being used. The net sales cards will be similarly perforated in columns 6 to 15 with the quantity and value of the net sales for the current year up to the first of the current month in direct numbers. Said cards will also have total returns for the year to the first of the current month perforated in columns 16 to 25. The cards representing current months' returns are perforated slightly different from the cards representing sales for the current month and the net sales for the current year up to the first of the current month.

The left portion of a card representing returns is illustrated in Fig. 4. The quantity of returns is perforated in direct numbers in the columns 16 to 18 and the value thereof in direct numbers in columns 19 to 25. In columns 6 to 8 of said card the quantity is punched complementarily and the value of the returns is likewise punched complementarily in columns 9 to 15. In the illustrative card shown in Fig. 4 the number of returns is "3" and the value thereof is $30.00. Accordingly, a "3" is punched in columns 18 and 22, while in columns 6 to 8, the value "997" is perforated, this being the complement of three. In columns 9 to 15 the value "9997000" is perforated, this being the complement of $30.00.

In the fifth column a hole appears in the "9" index point position thereby designating the card as representing current months' returns. The article number is perforated as 1012 in columns 1 to 4, inclusive. In order to get the desired result, the following setup of the machine may be made.

The first four relays 16 on the right of Fig. 1 are plugged, as described before herein, to the upper and lower brushes corresponding to columns 1 to 4, inclusive (Fig. 1). The remaining relay 16 in Fig. 1 is plugged to the upper and lower brushes for column 5 and the plug wire 22 is inserted as shown in Fig. 1 in the plug socket 18 associated with the first relay 16 on the left (Fig. 1). The switches 20, 21 will be left in open position, while the auto reset and auto start switches will be closed. The list-non-list lever of the machine will be set to non-listing position. The lower plug sockets 27 corresponding to columns 1 to 5 will be plugged to the printing bank No. 1 by inserting suitable plug wires between the proper sockets 27 and five of the plug sockets 33 associated with said printing bank (Fig. 1) so that the major and minor group numbers will be printed on the record sheet by said printing bank.

The plug sockets 27 associated with the lower brushes sensing columns 6 to 8, respectively, will be connected by suitable plug wires to the plug sockets 33 associated with counter No. 1.

The plug sockets 27 associated with the lower brushes sensing columns 9 to 15, inclusive, will be plugged to counter No. 2. Similarly, plug sockets 27 associated with the group of brushes reading columns 16 to 18, and 19 to 25, respectively, will be plugged to counters Nos. 3 and 4. All of the non-list switches 38 will be left in open position, while the switch NT will be closed and switch TS opened. The switches 40 associated with all the counters will likewise be closed. Preliminarily to the tabulating of the cards, they will be sorted to groups so that all cards relating to a given article fall in a single major group with the cards perforated at "1" representing current months' sales first, the cards perforated "9" representing current months' returns second, while the single card perforated "2" to represent net sales year to first of the current month occurs last.

The card groups will preferably (but not necessarily) be arranged in numerical order according to the major group number. The machine will be started by closing the main switch, not shown, thereby energizing the line wires 10, 12 and causing the reset control and motor control relays to become energized as described before herein. The reset key is next depressed to cause two preliminary resetting cycles to set up the major and minor relays as previously described, thereby deenergizing the reset control and motor control relays. The tabulating mechanism is then started manually to initiate the first tabulating cycle by depressing the start key so that the first card is fed into position to close the upper card lever contacts UCL2, UCL1. The start key must be held depressed until a second cycle has been initiated.

During the first card cycle, the first card will be fed from the magazine into a position where, near the end of the cycle, the leading edge of said card will be just under the upper brushes at which point the upper card lever contacts UCL3 will open while UCL1 and UCL2 will be closed.

During this first cycle none of the contacts 17 will have been closed, since the contacts LCL1 remain open preventing circuits from being established through the magnets 16. The cam contacts T4 will open during this cycle, but have no effect since the contacts 17 and UCL1 are still shunted by the contacts LCL2 and UCL3 at the time when said cam contacts open. Thus, the major and minor relays will remain energized.

During the second card cycle the contacts UCL3 will be open, consequently, the opening of cam contacts T4 during this cycle will cause the minor relay to become deenergized but the major relay will not be affected due to the fact that the lower card lever contacts LCL2 are closed at the time the cam contacts T4 open. Thus, a single resetting cycle will subsequently take place due to the deenergization of the minor relay. Toward the end of the second card cycle the cam contacts LCL1 close and LCL2 open, at a point where the first card arrives in a position with its leading edge just underneath the lower brushes at which point the second card will be in a corresponding position underneath the upper brushes. At the end of the single resetting cycle, the tabulating motor will restart automatically as a result of closure of cam contacts P2, the automatic starting circuit being permitted due to the fact that contacts LCL1 and UCL2 are now closed. The machine will now commence to tabulate the cards without further manual control.

All the sales cards in a major group will be tabulated first. Eventually either a current months' return card (designated with a "9" in the fifth column) or a net sales card (designated "2") may be fed under the upper brushes. This will cause a change in the minor group number which will be sensed by the upper and lower brushes in the fifth column in cooperation with the first relay 16 on the left (Fig. 1).

Since the contacts 17 of said relay 16 will not be closed due to failure of said relay to become energized, the machine will stop and one resetting cycle will be initiated automatically as described above and as a consequence thereof the total of the current month's sales will be printed. However, none of the counters will be cleared since deenergization of the minor relay breaks the circuit through the zero button relay ZBR. As a result all the magnets ZB1 to ZB4, inclusive, will remain deenergized during this single resetting cycle. Obviously, the total will be printed during this resetting cycle since the switches 40 and NT are closed, and the contacts 53 are also closed, thereby permitting the usual total printing circuits to be set up from the line wire 10, through switches 40 (closed), the total printing contacts 39, listing magnets 36, 36a in each counter, lower cam contacts LP1 to LP4, inclusive (closed), the switch NT, contacts R2 (closed), contacts 53 (closed), to the line wire 12.

Fig. 5 illustrates a specimen of the record sheet showing the arrangement of the group numbers and totals after each resetting cycle. For the present it will be assumed that the cards of the major group designated 1012 on said specimen are being tabulated. After the current month's sales of the group designated 1012 have been tabulated, the total thereof will be printed as described on the first printed line exhibiting the article number 1012 in Fig. 5, which indicates that the gross sales for the month of article 1012 amounted to 99 in quantity and $990.00 in value. The asterisk on this line indicates that the total was printed. Asterisks were printed by counters Nos. 3 and 4 also, but no totals were printed since said counters were already clear.

The current month's returns cards of the group designated 1012 will next be tabulated in the same fashion and the quantity and value perforated in columns 6 to 8 and 9 to 15, respectively, of each card will be subtracted complementarily from the totals on counters Nos. 1 and 2, respectively, while the direct numbers appearing in columns 16 to 25 of each card will be accumulated on counters Nos. 3 and 4, respectively.

The group control mechanism will again sense a change in group number and become effective to deenergize the minor relay, thereby causing a single resetting cycle in exactly the same fashion as before. During this resetting cycle the total returns which were accumulated in counters Nos. 3 and 4 will be printed in the last two columns of the record sheet and in line with the group numbers 1012 and 9 (Fig. 5), while in the middle two columns the net sales for the current month will be printed from counters Nos. 1 and 2. During the tabulation of the current month's returns cards, the group number will, of course, be printed on the record sheet. It should be remarked here that, as spacing of the record sheet occurs only after a total is printed when the machine is operating non-listing (as in Patent No. 1,762,145), each total will be printed opposite the corresponding group numbers. As before, the counters will not be cleared.

The machine will then tabulate a single card designating net sales, year to first of the current month. When the latter card is fed under the lower brushes a card designated 1071 will be fed under the upper brushes and the resulting disagreement between the perforations representing both the major and the minor group numbers causes both the major and minor relays to become deenergized, thereby initiating two resetting cycles.

During the first of these resetting cycles a total will be printed on the line in which the group numbers 1012 and 2 are printed, which total will represent net sales, year to the end of the current month. During this same cycle the setting up of the minor relay causes its upper points to close to energize the zero button relay ZBR, thus preparing the machine for energization of all the zero button magnets ZB1 to ZB4, respectively, when during the next resetting cycle cam contacts LP8 to LP11 close. The minor relay and the zero button relay ZBR will remain energized owing to the holding circuit established through the upper points of the minor relay, the cam contacts T4 or the contacts 17, the contacts 17 having been latched up at the end of the cycle in which the last card of major group 1012 was tabulated.

The total printed during the first of the two cycles is in reality a major total although printed during a minor total cycle. This is due to the fact that none of the counters are cleared during any of the minor cycles and no further items are accumulated before the major total cycle takes place to repeat the total.

During the second resetting cycle which ensues as a consequence of the major relay being de-energized holding the reset control magnet energized, the counters will all be reset to zero, due to energization of the zero button magnets ZB1 to ZB4 by closure of cam contacts LP8 to LP11. However, no total will be printed, owing to the fact that the contacts 53 are still open. After the first resetting cycle, during which occurred the printing of the net sales year to the end of the current month, the record sheet will be spaced one line space as described in Patent No. 1,762,145.

If the contacts 53 were not provided, the second resetting cycle would cause a second total to be printed on the line immediately after the total representing net sales year to the end of the current month. Since this total would be the same in the present case as the one previously printed, owing to the counter not having been reset during the first resetting cycle, the record sheet as produced by prior machines would contain duplicate totals at the end of each group, which duplicate totals would be undesirable as they lead to error and confuse the record sheet.

It will be seen that the total is suppressed during the second resetting cycle after a major change so that only a blank line will appear on the record sheet. In order to get the same result in prior machines, it would be necessary to open the automatic start switch to prevent automatic restarting of the tabulating motor and to control the member 46 (Fig. 2) manually. In other words, the machine would always stop at the end of every resetting cycle to permit the operator to shift the members 46 and open the non-total switch manually whereby to cause the machine to reset without printing the total.

Obviously such manual procedure would be both time consuming and laborious, as well as being susceptible to error due perhaps to failure of the operator to open the non-total switch NT properly or to clutch all of the counters to the reset shaft 42.

According to the present machine the sequence of operations is always invariable and automatic and there is no chance of error due to failure to manipulate the proper switches or clutches. The human element is eliminated and the machine operates automatically from start to finish.

Under certain circumstances it is possible that there might not be either current month's sales cards or cards representing returns, or both. Either or both of the foregoing situations is taken care of automatically by the machine which will print the proper totals. For instance, in Fig. 5 the totals corresponding to the major group 1011 indicate that there were no returns, that is to say, a series of cards designated 1011, representing sales, has been tabulated and the total thereof printed, then a single card designated 1011, representing net sales, year to first of current month has been tabulated and the net amount accumulated on the accumulators printed. Thus, the second group number 1011 (Fig. 5) represents net sales year to end of current month.

The totals corresponding to the major group designated 1071 (Fig. 5) were secured by tabulating a group of cards in which no current months' sales cards were presented, that is to say, there was present in the major group 1071 one or more cards representing returns for the current month and a single card representing net sales year to first of current month. The items on the current month's returns cards designated 1071 were accumulated as complements on counters Nos. 1 and 2 and as direct numbers on counters Nos. 3 and 4. When the amounts punched on the card for net sales year to first of current month were added to the total returns, the complements on counters Nos. 1 and 2 were converted to direct numbers so that, when the totals were finally printed, such totals appeared on the record sheet as direct numbers.

In the case of the group designated 1012 there were no returns year to first of current month perforated on the last single card representing net sales year to the first of the current month, hence the totals accumulated in counters Nos. 3 and 4 were unchanged by the passage of the card representing net sales year to first of current month. In the case of the group designated 1071 the card representing net sales year to first of month had punched in columns 16 to 25 the total returns for the year to the first of the current month. In the case of the group designated 1011 the card representing net sales year to first of month had no gross returns for the year to the first of the month perforated therein. Obviously, the complements printed as totals on the first line of the group 1071 are superfluous as the true totals appear as direct numbers immediately to the right thereof.

The present invention, for convenience in description and to assist in explaining the principle thereof, has been disclosed as embodied in a specific form in a particular type of record controlled machine, however, it is to be understood that the invention is not limited to the precise form or machine selected for purposes of description as it may be embodied in other forms or in other machines equally as well without departing from the principles set forth herein.

What is claimed is as follows:

1. A record controlled machine comprising accumulating mechanism adapted to accumulate items under control of data designations in the controlling records, said items being identified by major and minor classification designations; total printing mechanism adapted to print totals of said items under control of the accumulating mechanism and including mechanism for resetting the accumulating mechanism to zero, means for sensing changes in both the major and minor classification designations and operative to initiate a single cycle of operations of the total taking mechanism to print a minor total on a change in minor classification designations and two cycles on a change in major classification designations to print major and minor totals, and means controlled by the group control mechanism for automatically suppressing the printing of a major total and including means for calling into operation the resetting mechanism during the second cycle resulting from a change in major classification designations.

2. A record controlled machine comprising accumulating mechanism, total printing mechanism controlled by the accumulating mechanism and operable in cycles and including means adapted to reset the accumulating mechanism, means for automatically initiating several successive cycles of said mechanism including means for calling the resetting means into operation during one of said cycles when more than one cycle is initiated, and means automatically controlled by the initiating means for suppressing the printing of all totals during a cycle in which the resetting means is in operation.

3. In a record controlled machine having accumulating mechanism and means to print totals from the accumulating mechanism, automatic group control mechanism operative when a predetermined change in group occurs to initiate a single cycle of the total taking means and when a different change occurs to initiate more than one cycle of the total printing means, said last-named cycles occurring in succession; and means controlled by the group control mechanism to suppress the printing of one or more of the totals that would normally be printed during cycles following the first of a succession of total cycles.

HUGH F. GARMAN.
HERBERT H. WOODRUFF.